(12) United States Patent
Ichimura

(10) Patent No.: US 10,319,378 B2
(45) Date of Patent: Jun. 11, 2019

(54) INTERACTION APPARATUS AND METHOD

(71) Applicant: KABUSHIKI KAISHA TOSHIBA, Tokyo (JP)

(72) Inventor: Yumi Ichimura, Chiba (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 117 days.

(21) Appl. No.: 15/257,203

(22) Filed: Sep. 6, 2016

(65) Prior Publication Data

US 2017/0040019 A1 Feb. 9, 2017

Related U.S. Application Data

(63) Continuation of application No. PCT/JP2015/059821, filed on Mar. 23, 2015.

(30) Foreign Application Priority Data

Jun. 27, 2014 (JP) .................................. 2014-132781

(51) Int. Cl.
*G10L 15/18* (2013.01)
*G10L 15/22* (2006.01)
(Continued)

(52) U.S. Cl.
CPC .............. *G10L 15/22* (2013.01); *G10L 13/00* (2013.01); *G10L 15/063* (2013.01); *G10L 15/08* (2013.01);
(Continued)

(58) Field of Classification Search
CPC .. G06F 17/2785; G06F 17/27; G06F 17/2715; G06F 17/2809; G06F 17/3043;
(Continued)

(56) References Cited

U.S. PATENT DOCUMENTS 7,624,007 B2 * 11/2009 Bennett .................... G06F 17/27
704/257
7,720,674 B2 5/2010 Kaiser et al.
(Continued)

FOREIGN PATENT DOCUMENTS

JP 2600081 4/1997
JP 2004-219714 8/2004
(Continued)

OTHER PUBLICATIONS

Nagae, H., et al., Spoken Dialogue Technology to Understand Problems and Offer Solutions, Toshiba Review, vol. 68, No. 9, pp. 14-17 (2013).
(Continued)

*Primary Examiner* — Vijay B Chawan
(74) *Attorney, Agent, or Firm* — Finnegan, Henderson, Farabow, Garrett & Dunner, L.L.P.

(57) ABSTRACT

According to one embodiment, an interaction apparatus includes an interaction apparatus includes a storage, a first extractor, a retriever, a generator, a second extractor and a register. The storage stores a problem and at least one solution for solving the problem. The first extractor extracts a target problem which is an expression regarded as the problem, from a first speech. The generator generates a first speech-prompting sentence prompting the user to make a speech including the target solution if the storage stores no target solution or if the user rejects the target solution. The second extractor extracts the target solution from a second speech which is a response of the user relating to the first speech-prompting sentence. The register registers, on the storage, the target problem and the target solution.

20 Claims, 11 Drawing Sheets

(51) Int. Cl.
*G10L 13/00* (2006.01)
*G10L 25/54* (2013.01)
*G10L 15/06* (2013.01)
*G10L 15/08* (2006.01)
*G10L 15/30* (2013.01)

(52) U.S. Cl.
CPC .......... *G10L 15/1822* (2013.01); *G10L 15/30* (2013.01); *G10L 25/54* (2013.01); *G10L 2015/0635* (2013.01); *G10L 2015/088* (2013.01); *G10L 2015/221* (2013.01)

(58) Field of Classification Search
CPC ........... G06F 17/30684; G06F 17/2775; G06F 17/2818; G06F 17/30401; G06F 17/30654; G06F 17/30557; G06F 17/30734; G06F 17/271; G06F 17/2755; G06F 17/30663; G10L 15/22; G10L 15/142; G10L 15/18; G10L 15/1815; G10L 15/183; G10L 15/285; G10L 15/30; G10L 15/1822; G10L 15/26; Y10S 707/99933; Y10S 707/99935
USPC ........ 704/9, 257, 243, 251, 254, 255, 270.1; 707/999.005, 706, 769, 803, 999.003, 707/999.006, 999.009, 999.1
See application file for complete search history.

(56) References Cited

U.S. PATENT DOCUMENTS

| | | | | |
|---|---|---|---|---|
| 7,912,702 | B2 * | 3/2011 | Bennett | G06F 17/27 704/243 |
| 7,987,151 | B2 * | 7/2011 | Schott | G06N 5/043 706/45 |
| 8,554,539 | B2 * | 10/2013 | Kim | G06F 17/2755 701/1 |
| 9,460,075 | B2 * | 10/2016 | Mungi | G06F 17/271 |
| 9,576,574 | B2 * | 2/2017 | van Os | G10L 15/22 |
| 9,916,538 | B2 * | 3/2018 | Zadeh | G06K 9/627 |
| 2008/0059178 | A1 | 3/2008 | Yamamoto et al. | |
| 2008/0255845 | A1 * | 10/2008 | Bennett | G06F 17/27 704/257 |
| 2009/0077062 | A1 * | 3/2009 | Spivack | G06Q 30/02 707/999.005 |
| 2009/0210411 | A1 * | 8/2009 | Murata | G06F 17/30663 |
| 2010/0228540 | A1 * | 9/2010 | Bennett | G06F 17/27 704/9 |
| 2010/0235341 | A1 * | 9/2010 | Bennett | G06F 17/27 707/706 |
| 2015/0006441 | A1 | 1/2015 | Suzuki et al. | |
| 2015/0039655 | A1 * | 2/2015 | Spivack | G06Q 30/02 707/803 |

FOREIGN PATENT DOCUMENTS

| | | |
|---|---|---|
| JP | 2005-267092 | 9/2005 |
| JP | 4181590 | 11/2008 |
| JP | 2011-170633 | 9/2011 |
| JP | 2013-196385 | 9/2013 |
| WO | WO 2012/135229 A2 | 10/2012 |

OTHER PUBLICATIONS

Written Opinion of the International Searching Authority issued by the Japanese Patent Office in International Application No. PCT/JP2015/059821, dated Jun. 23, 2015 (4 pages).

International Search Report issued by the Japanese Patent Office in International Application No. PCT/JP2015/059821, dated Jun. 23, 2015 (2 pages).

International Preliminary Report on Patentability , issued by the International Bureau of WIPO, in International Application No. PCT/JP2015/059821, dated Jan. 5, 2017 (6 pages), including a Written Opinion already of record.

* cited by examiner

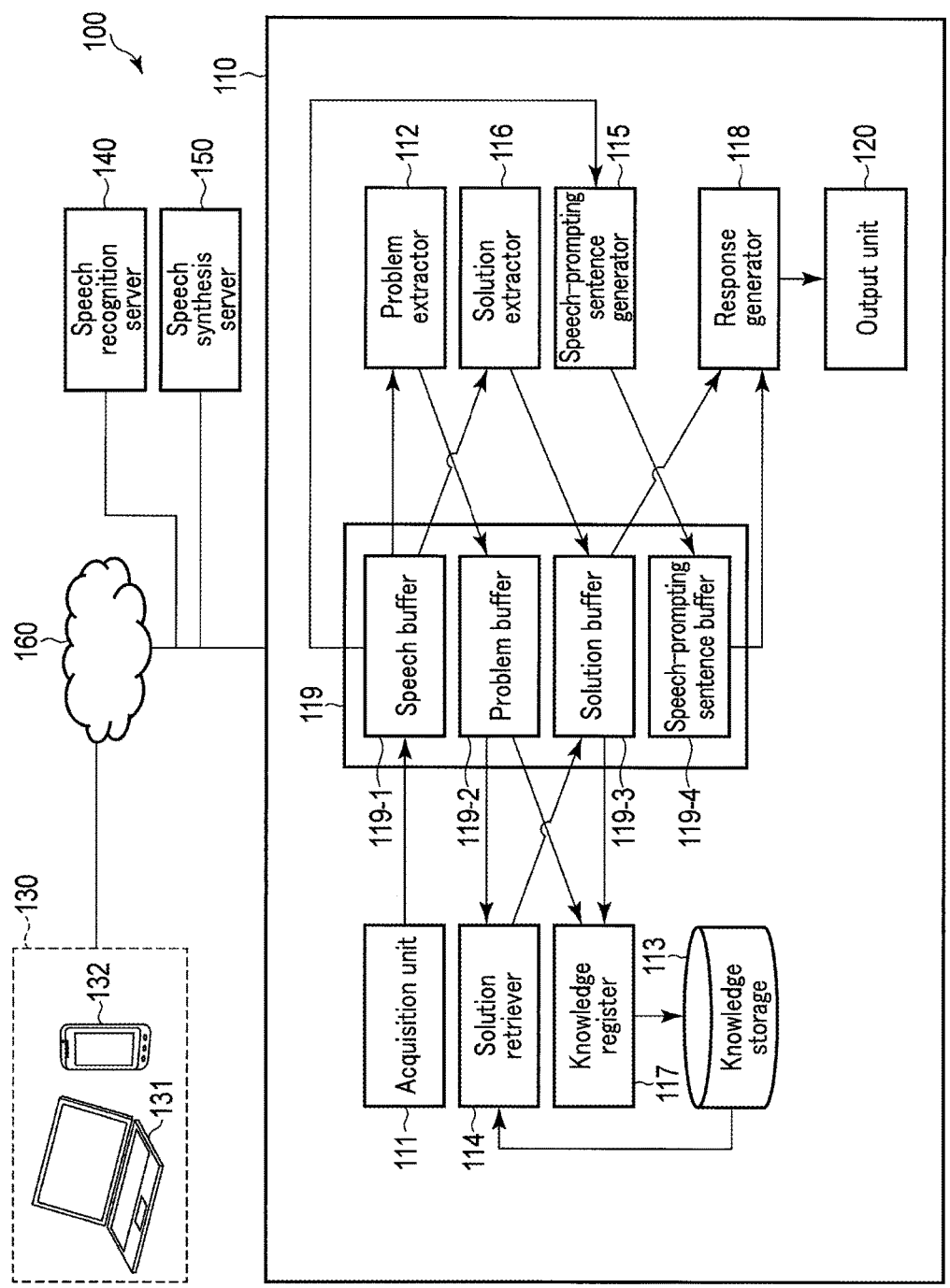
F I G. 1

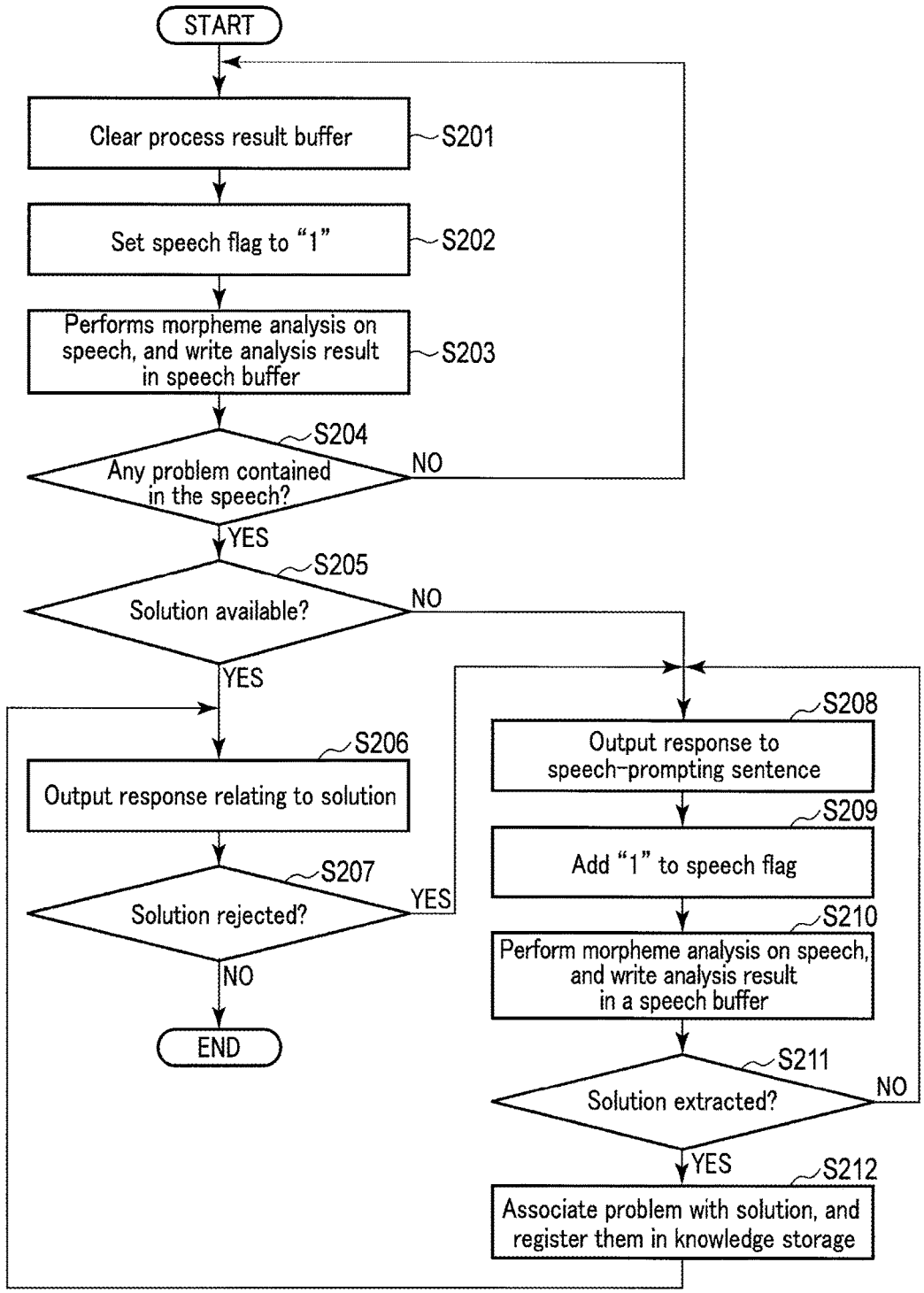
F I G. 2

| ID | Part of speech pattern |
|---|---|
| P001 | Noun phrase + case particle+ verb + auxiliary verb (wishing) |
| P002 | Noun phrase + case particle + verb + auxiliary verb (past) |
| P003 | Noun phrase + case particle + verb + auxiliary verb (assertive) |
| P004 | Noun phrase + *"no"* (of) + noun phrase |
| P005 | Adjective + (auxiliary verb / ending particle) |
| P006 | Adjective verb + (auxiliary verb / ending particle) |

| | 501 | 502 | 503 | 504 |
|---|---|---|---|---|
| | ID | Problem | Solution | Certainty degree |
| | K00001 | *Ramen ga tabe tai*<br>I want to eat Chinese noodles | *Chukaryouriten wo sagasu*<br>Find a Chinese restaurant | 1.0 |
| | K00002 | *Jikan ga amatta*<br>I have spare time | *kafe wo sagasu*<br>Find a café | 0.7 |
| | K00003 | *Jikan ga amatta*<br>I have spare time | *Syoten wo sagasu*<br>Find a bookstore | 0.3 |
| | K00004 | *Tsuma no tanjoubi*<br>It's my wife's birthday today | *Resutoran wo sagasu*<br>Find a restaurant | 0.6 |
| | K00005 | *Tsuma no tanjoubi*<br>It's my wife's birthday today | *Hanaya wo sagasu*<br>Find a florist's | 0.3 |
| | K00006 | *Tsuma no tanjoubi*<br>It's my wife's birthday today | *Housekiten wo sagasu*<br>Find a jeweler's | 0.1 |
| | K00007 | *Taikutuda*<br>I feel weary | *Ongaku wo kakeru*<br>Turn on the record player | 0.6 |
| | K00008 | *Taikutuda*<br>I feel weary | *terebi wo tukeru*<br>Switch on the TV | 0.4 |

FIG. 5

| ID | Word pattern | Speech-prompting sentence |
|---|---|---|
| H001 | *Wasureta*<br>I've forgotten | *Nanika otetsudai dekirukoto ha arimasu ka*<br>What can we do for you? |
| H002 | *Tabetai*<br>I want to eat | *Dokode osyokuji wo shitai desu ka*<br>Where would you like to eat? |
| H003 | *Mitai*<br>I want to see | *Dokode mimasyou ka*<br>Where shall we see it? |

FIG. 7

| List number | Speech | Morpheme analysis result | Speech flag |
|---|---|---|---|
| 1 | *Copy wo wasure ta* (I've forgotten copying it) | Copy ⟨noun⟩ + *wo* ⟨case particle⟩ + *wasure* ⟨verb⟩ + *ta* ⟨auxiliary verb (past)⟩ | 1 |
| 2 | *Copy ga dekiru tokoro wo sagashi te* (Find place where a copy can be made) | Copy ⟨noun⟩ + *ga* ⟨case particle⟩ + *dekiru* ⟨verb⟩ + *tokoro* ⟨noun⟩ + *wo* ⟨case particle⟩ + *sagashi* ⟨verb⟩ + *te* ⟨conjunctive particle⟩ | 2 |
| 3 | *Konnbini ka na* (Is it a convenience store?) | *Konnbini* ⟨noun⟩ + *ka* ⟨ending particle⟩ + *na* ⟨ending particle⟩ | 3 |

F I G. 13

*Copy wo wasure ta*
I've forgotten copying it

F I G. 14

| List number | Solution | Certainty degree | Identification flag |
|---|---|---|---|
| 1 | *Konnbini wo sagasu* Find a convenience store | 1.0 | 1 |

F I G. 15

| List number | Speech-prompting sentence |
|---|---|
| 1 | *Nanika otetsudai dekirukoto ha arimasuka* What can we do for you? |
| 2 | *Copy ga dekiru tokoro toha* The place where a copy can be made is ··· |

F I G. 16

INTERACTION APPARATUS AND METHOD

CROSS-REFERENCE TO RELATED APPLICATIONS

This application is a Continuation Application of PCT Application No. PCT/JP2015/059821, filed Mar. 23, 2015 and based upon and claiming the benefit of priority from Japanese Patent Application No. 2014-132781, filed Jun. 27, 2014, the entire contents of which are incorporated herein by reference.

FIELD

Embodiments described herein relate generally to an interaction apparatus and method.

BACKGROUND

The audio interaction application called "personal assistant," used in smartphones, etc., can operate in accordance with a relatively free utterance, unlike the command-type interaction system that can accept prescribed commands. Assume that the user says, "Let me know the weather forecast" to the smartphone. In response to the user's request, the smartphone activates the interaction application and then displays the weather forecast on its display screen.

The user may say, "I'll play golf tomorrow," an unclear indication. In this case, the smartphone interprets the unclear indication, determining that the user means to say, "Let me know the weather forecast for tomorrow." Then, the smartphone activates the interaction application and displays the weather forecast. In order to perform such a problem-solving interaction, the smartphone must store problem-solving knowledge in which various problems are associated with the solutions. The problem-solving knowledge may be prepared on the basis of the corpus and the speech history, in order to prepare solutions. Alternatively, the problem-solving knowledge may be based on questionnaire collected from the users, which shows the problems (i.e., questions) the users may give to the smartphone.

Still alternatively, the user's various oral instructions may be stored in association with the user's remote-control operations.

BRIEF DESCRIPTION OF THE DRAWINGS

FIG. 1 is a block diagram showing an interaction system including an interaction apparatus.

FIG. 2 is a flowchart showing an operation of the interaction apparatus.

FIG. 5 is a diagram showing an example of the knowledge storage.

FIG. 7 is a diagram showing an example of a speech-prompting sentence table.

FIG. 13 is a diagram showing an example of the speech buffer.

FIG. 14 is a diagram showing an example of the problem buffer.

FIG. 15 is a diagram showing an example of the solution buffer.

FIG. 16 is diagram showing an example of the speech-prompting sentence buffer.

DETAILED DESCRIPTION

Figures 3, 4:
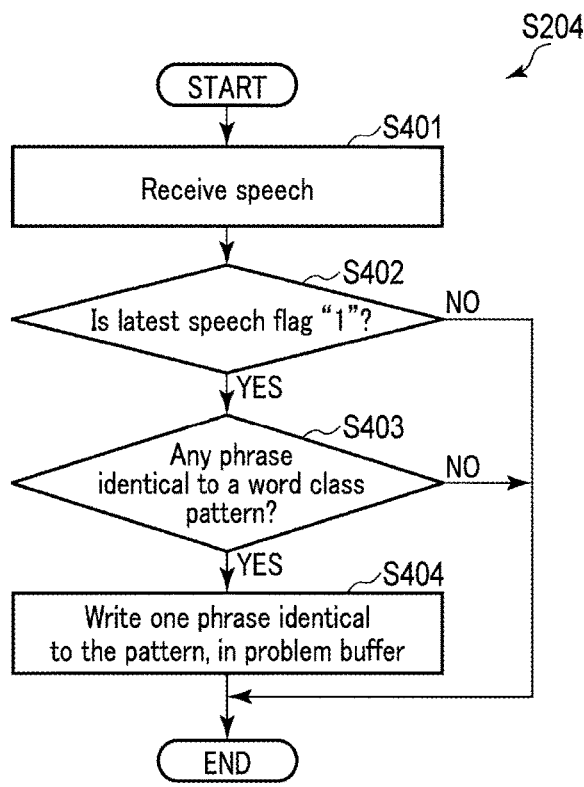
FIG. 3 is a diagram showing an example of the problem expression table.
FIG. 4 is a diagram showing an example of the problem extraction process performed in the problem extractor.

In the technique of preparing problem-solving knowledge, a high cost and a long time are spent. This is because the problem-solving knowledge is generated and then updated. In the technique of storing the user's oral instructions and user's remote-control operations in association with the user's oral instructions, any reason for operation (i.e., problem) cannot be associated with the operation (i.e., solution) before the solution is taken. This is because the user asks for the reason for the operation after operating the apparatus.

In general, according to one embodiment, an interaction apparatus includes a storage, a first extractor, a retriever, a generator, a second extractor, a register. The storage stores a problem and at least one solution for solving the problem, in association with each other. The first extractor extracts a target problem which is an expression regarded as the problem, from a first speech of a user. The retriever retrieves, from the storage, a target solution which is a solution corresponding to the target problem. The generator generates a first speech-prompting sentence if the storage stores no target solution or if the user rejects the target solution, the first speech-prompting sentence prompting the user to make a speech including the target solution. The second extractor extracts the target solution from a second speech which is a response of the user relating to the first speech-prompting sentence. The register registers, on the storage, the target problem and the target solution in association with each other.

Hereinafter an interaction apparatus and method according to each of the embodiments will be described in detail with reference to the drawings. It should be noted that in the embodiments described hereinafter, parts denoted by identical reference symbols are considered to carry out identical operations, and a duplicate description is appropriately omitted.

The interaction system according to this embodiment presents specific solutions in response to not only to clear instructions, but also to unclear instructions. The speech received may be "Help! This is an emergency." Then, the interaction system recognizes the problem and starts finding a solution to the problem, or "what should be done for the emergency case." More specifically, the interaction system may inform the user of, for example, the facility to which the emergency should be reported and the sites where automatic external defibrillators (AEDs) are available.

An interaction system including an interaction apparatus according to the embodiment will be described with reference to the block diagram of FIG. 1.

The interaction system 100 according to the embodiment includes an interaction apparatus 110, terminal devices 130, a speech recognition server 140, and a speech synthesis server 150.

The terminal devices 130 are, for example, a personal computer 131 and a smartphone 132. The personal computer 131 or the smartphone 132 receive a speech from the user and convert the speech to audio data. The audio data is transmitted to the speech recognition server 140 via a network 160 such as the Internet or the mobile telephone network.

The speech recognition server 140 receives the audio data from the terminal device 130 via the network 160, performs a speech recognition process on the audio data, converting the audio data to a speech text.

The interaction apparatus 110 receives the speech text from the speech recognition server 140 via the network 160. The interaction apparatus 110 processes the speech text, determining the intension and problem conveyed in the speech text, and then generates a response text, i.e., response to the speech made at the terminal device 130.

The speech synthesis server 150 receives the response text from the interaction apparatus 110 via the network 160 and performs speech synthesis on the response text, thus generating audio data. The audio data is transmitted from the interaction apparatus 110 to the terminal device 130 via the network 160. The user of the terminal device 130 can therefore receive, as an oral speech, the response coming from the interaction apparatus 110.

The interaction apparatus 110 will be described in detail.

The interaction apparatus 110 according to the embodiment includes an acquisition unit 111, a Problem extractor 112, a knowledge storage 113, a solution retriever 114, a speech-prompting sentence generator 115, a solution extractor 116, a knowledge register 117, a response generator 118, a process result buffer 119, and an output unit 120.

The process result buffer 119 includes a speech buffer 119-1, a problem buffer 119-2, a solution buffer 119-3, and a speech-prompting sentence buffer 119-4.

The acquisition unit 111 receives the speech text of the user's speech from the speech recognition server 140 and performs morpheme analysis on the speech text. The acquisition unit 111 then writes the speech text and the result of the morpheme analysis in the speech buffer 119-1. For simplicity of explanation, the process performed on the speech text will be hereinafter referred to as "process performed on the speech."

The problem extractor 112 receives the speech and the result of the morpheme analysis from the speech buffer 119-1, and extracts a target problem which is an expression regarded as the problem. The problem extractor 112 writes the target problem so extracted, in the problem buffer 119-2. The process the problem extractor 112 performs will be described later with reference to FIG. 3 and FIG. 4. The problem extractor 112 may receive the speech and the result of the morpheme analysis, directly from the acquisition unit 111.

The knowledge storage 113 stores problems and at least one solution for solving each problem, each problem associated with at least one solution. The set of one problem and at least one solution is referred to as a problem-solving knowledge. The knowledge storage 113 will be described later with reference to FIG. 5.

The solution retriever 114 receives the target problem, from the problem buffer 119-2, and retrieves, from the knowledge storage 113, a target solution which is a solution corresponding to the target problem. The solution retriever 114 may receive the target problem, directly from the problem extractor 112. The process the solution retriever 114 performs will be described later with reference to FIG. 6. If any target solution exists, it is written in the solution buffer 119-3. If no target solution exists, the solution retriever 114 generates undetected information showing that no target solution exists.

The knowledge storage 113 may store no target solution, or the target solution presented may be rejected by the user. In either case, the speech-prompting sentence generator 115 receives the speech from the speech buffer 119-1 and generates a speech-prompting sentence from the user's speech. The speech-prompting sentence is a sentence that prompts the user to make a speech including a solution. The speech-prompting sentence generator 115 writes the speech-prompting sentence in the speech-prompting sentence buffer 119-4. The speech-prompting sentence generator 115 may receive the speech directly from the acquisition unit 111. It may be determined that no target solution is stored in the knowledge storage 113, if the speech-prompting sentence generator 115 receives undetected information from the solution retriever 114 or if the solution buffer 119-3 stores no solutions and the speech-prompting sentence generator 115 detects that no target solution is available. Note that "the target solution presented may be rejected by the user" means that the user does not agree to the solution (measure) presented, instructing modification of the solution or expressing dissatisfaction of the solution. The process the speech-prompting sentence generator 115 performs will be described later with reference to FIG. 7 and FIG. 8.

The solution extractor 116 receives the user's speech made in response to the speech-prompting sentence, from the speech buffer 119-1, and then extracts the target solution from the user's speech. The solution extractor 116 then writes the target solution in the solution buffer 119-3. The solution extractor 116 may receive the speech directly from the acquisition unit 111. The process the solution extractor 116 performs will be described later with reference to FIG. 9 and FIG. 10.

The knowledge register 117 receives the target problem from the problem buffer 119-2, and the target solution from the solution buffer 119-3. The knowledge register 117 associates the target problem and the target solution with each other, generating new problem-solving knowledge. The new problem-solving knowledge is registered (stored) in the knowledge storage 113. The knowledge register 117 may receive the target problem directly from the problem extractor 112, and may receive the target solution directly from the solution extractor 116. The process the knowledge register 117 performs will be described later with reference to FIG. 12.

The response generator 118 receives a target solution, or solution, from the solution buffer 119-3, and a speech-prompting sentence from the speech-prompting sentence buffer 119-4. The response generator 118 then generates a response text adjusted in terms of expression. The response generator 118 may receive the solution directly from the solution retriever 114, the solution directly from the solution extractor 116, and the speech-prompting sentence directly from the speech-prompting sentence generator 115.

As described above, the process result buffer 119 temporarily stores the process result. More specifically, the speech buffer 119-1 receives a speech from the acquisition unit 111 and stores the speech. The problem buffer 119-2 receives a problem from the problem extractor 112 and stores the problem. The solution buffer 119-3 receives a solution from the solution retriever 114 or from the solution extractor 116, and stores the solution. The speech-prompting sentence buffer 119-4 receives a speech-prompting sentence from the speech-prompting sentence generator 115, and stores the speech-prompting sentence.

The output unit 120 receives a response text from the response generator 118 and outputs the response text to the speech synthesis server 150.

Next, the operation of the interaction apparatus 110 according to the embodiment will be described with reference to the flowchart of FIG. 2.

In Step S201, the information is cleared in the buffers of the process result buffer 119.

In Step S202, the speech flag showing the time-sequence order of a speech is set to "1."

In Step S203, the acquisition unit 111 performs a morpheme analysis on the speech, associates the speech, result of the morpheme analysis and speech flag with one another, and writes the speech, result of the morpheme analysis and speech flag in the speech buffer 119-1.

In Step S204, the problem extractor 112 determines whether or not a problem is contained in the speech. That is, whether or not a target problem has been extracted is determined. If a target problem has been extracted, the process proceeds Step S205. If no target problem has been extracted, the process returns to Step S201. In this case, Steps S201 to 204 are repeated.

In Step S205, the solution retriever 114 retrieves the target solution associated with the target problem, from the knowledge storage 113, and determines whether or not the target solution is exist. If the target solution exists, the process proceeds Step S206. If no target solution exists, the process proceeds Step S208.

In Step S206, the response generator 118 adjusts the speech-prompting sentence in terms of expression, thereby generating a response. The response is output to user by the output unit 120 and subsequent process.

In Step S207, it is determined whether or not the solution has been rejected. More precisely, the solution is rejected if the acquisition unit 111 receives a user's speech including words such as "no" or "not that," rejecting the solution. If the solution is rejected, the process proceeds Step S208. If the solution is not rejected, the process is terminated.

In Step S208, the speech-prompting sentence generator 115 generates a speech-prompting sentence, and the response generator 118 adjusts the speech-prompting sentence in terms of expression, thereby generating a response text. The output unit 120 outputs the response text. The user therefore receives the response text in the form of a synthesized speech.

In Step S209, "1" is added to the speech flag.

In Step S210, the acquisition unit 111 performs morpheme analysis on the new speech the user has made in response to the speech-prompting sentence, associates the new speech, the result of the morpheme analysis and the speech flag with one another, and writes the new speech, result of the morpheme analysis and speech flag in the speech buffer 119-1.

In Step S211, it is determined whether or not the solution extractor 116 has extracted the solution. If the solution has been extracted, the process proceeds Step S212. If the solution has not been extracted, the process returns to Step S208 and Steps 208, 209, 210 and 211 will be repeated.

In Step S212, the knowledge register 117 associates the target problem with the target solution, generating new problem-solving knowledge. The new problem-solving knowledge is registered in the knowledge storage 113. Then, the process returns to Step S206. Thus, similar steps are then performed.

The problem expression table, which the problem extractor 112 refers to, will be described with reference to FIG. 3.

The problem expression table 300 stores IDs 301 and part of speech patterns 302. In the table 300, the part of speech patterns 302 are associated with IDs 301, respectively. Each part of speech pattern 302 is a combination of part of speech, which constitute a sentence. As seen from FIG. 3, the pattern 302 associated with ID301 "P001," for example, is "noun phrase+case particle+verb+auxiliary verb (wishing)." Speeches of this pattern 302 are, for example, "Dolphins ga mi tai (I want to see dolphins)" and "Sapparishitamono ga tabe tai (I want to eat something plain)."

Next, a problem extraction process of the problem extractor 112 will be explained with reference to the flowchart of FIG. 4.

In Step S401, the problem extractor 112 receives the speech held in the speech buffer 119-1.

In Step S402, the problem extractor 112 determines whether or not the speech flag attached to the latest speech is "1". If the speech flag is "1," the process proceeds Step S403. If the speech flag is not "1," the process is terminated.

In Step S403, the problem extractor 112 collates the speech with the speech flag "1" with the problem expression table 300, and determines whether or not the speech includes phrases (expression) identical to any part of speech patterns existing in the problem expression table 300. If the speech includes such phrases, the process proceeds Step S404. If the speech does not include such phrases, the process is terminated.

In Step S404, the problem extractor 112 writes one of the phrases identical to the part of speech patterns, as a target problem, in the problem buffer 119-2. To select one phrase from those identical to the part of speech patterns, the part of speech patterns may be sorted in the order of usefulness in the problem expression table and then collated with the phrase in the order of usefulness. If a phrase is found identical to any part of speech pattern, the problem extractor 112 will terminate the problem extraction process.

An example of the knowledge storage 113 will be described with reference to FIG. 5.

The knowledge storage 113 holds a table 500. The table 500 holds IDs 501, problems 502, solutions 503 and certainty degrees 504, which are associated with one another. The problems 502 are expressions, each specifying a problem to solve. The solutions 503 are expressions, each specifying a measure for solving one problem 502. The certainty degrees 504 are indices, each showing how much a solution 503 is useful to solve a problem 502 and how much it is related to the problem 502. Hence, the more useful to solve the problem and the more related to the problem, the higher the certainty degree will be. For example, ID501 "K00001," problem 502 "Ramen ga tabe tai (I want to eat Chinese noodles)," solution 503 "Chukaryouriten wo sagasu (Find a Chinese restaurant)," and certainty degree "1.0" are associated with one another and stored in the table 500.

Assume that the sum of the certainty degrees of any identical problems 502 is set to "1." Hence, the table 500 of FIG. 5 holds two solutions 503 "kafe wo sagasu (Find a café)" and "Syoten wo sagasu (Find a bookstore)" for the problem 502 "Jikan ga amatta (I have spare time)." The certainty degrees of the two solutions 503 are set to "0.7" and "0.3," so that the sum of these certainty degrees 504 may be "1.0."

Figure 6:
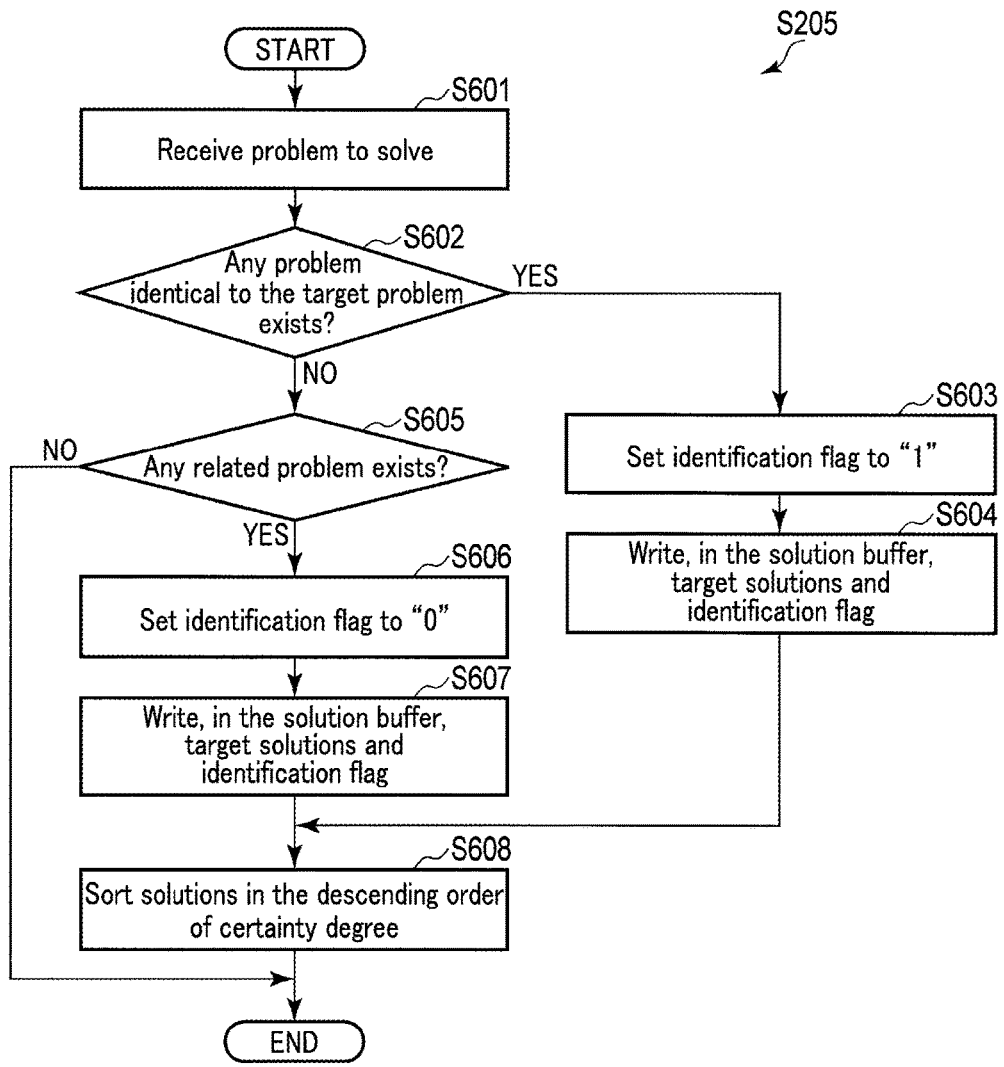
FIG. 6 is a flowchart showing a retrieving process of solution retriever.

Next, a retrieving process of the solution retriever 114 will be explained with reference to the flowchart of FIG. 6.

In Step S601, the solution retriever 114 receives a problem to solve, from the problem buffer 119-2.

In Step S602, the solution retriever 114 collates the target problem with the problems stored in the knowledge storage 113, determining whether or not the knowledge storage 113 stores a problem identical to the target problem. If the knowledge storage 113 stores the problem identical to the target problem, the process proceeds Step S603. If the knowledge storage 113 does not store the problem identical to the target problem, the process proceeds Step S605.

In Step S603, the solution retriever 114 sets an identification flag to "1." The identification flag indicates the degree of collation. The response generator 118 refers to the identification flag, changing the expression of the solution before the information held in the solution buffer 119-3 is transmitted to the output unit 120.

In Step S604, the solution retriever 114 writes, in the solution buffer 119-3, all target solution corresponding to the problems identified in Step S602, together with the identification flag.

In Step S605, the solution retriever 114 collates the target problem with the problems stored in the knowledge storage 113, thereby determining whether or not the related problem is related to the target problem stored in the knowledge storage 113. For example, it may determine whether or not the similarity between the target problem and any problem stored in the knowledge storage 113, in terms of character string, is equal to or higher than a threshold value. Any problem more similar to the target problem, in terms of category, may be regarded as the related problem. If the related problem exists, the process proceeds Step S606. If not, the process is terminated.

In Step S606, the solution retriever 114 sets the identification flag to "0 (zero)."

In Step S607, the solution retriever 114 writes, in the solution buffer 119-3, all solutions corresponding to the related problem as target solutions, together with the identification flag.

In Step S608, the solution retriever 114 sorts the solutions written in the solution buffer 119-3, in descending order of certainty degree. Then, the process of retrieving solutions is terminated.

An example of a speech-prompting sentence table, which the speech-prompting sentence generator 115 refers to, will be described with reference to FIG. 7.

As shown in FIG. 7, the speech-prompting sentence table 700 holds IDs 701, word patterns 702 and speech-prompting sentences 703 are associated, one with another. The word patterns 702 are words that may be used to express problems to solve. If ID701 is "H001," for example, the word pattern 702 is "Wasureta (I've forgotten)," and the speech-prompting sentence 703 is "Nanika otetsudai dekirukoto ha arimasu ka (What can we do for you)?" An example of a speech identified with ID701 of "H001" is "Copy wo wasure ta (I've forgotten copying it)." Thus, speech-prompting sentences 703 are prepared for the word patterns 702, respectively, and the speech-prompting sentences 703 are changed on the basis of the expressions of the speeches made. This makes it easy to prompt the user to utter a speech including a solution.

Figure 8:
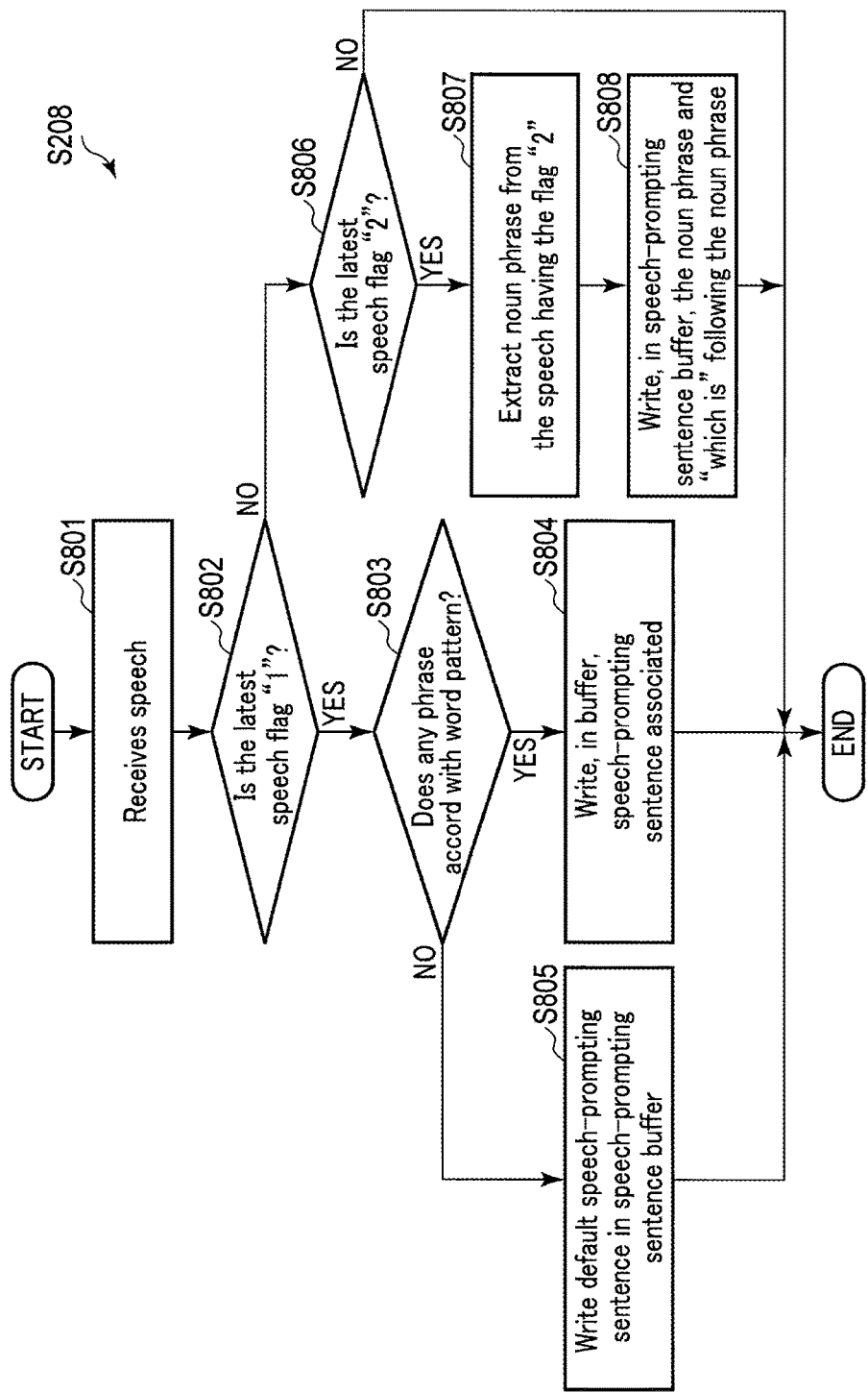
FIG. 8 is a flowchart showing a generation process of a speech-prompting sentence generator.

Next, the generation process of the speech-prompting sentence generator 115 will be explained with reference to the flowchart of FIG. 8.

In Step S801, the speech-prompting sentence generator 115 receives a speech from the speech buffer 119-1.

In Step S802, the speech-prompting sentence generator 115 determines whether or not the speech flag attached to the latest speech is "1". If the speech flag is "1," the process proceeds Step S803. If the speech flag is not "1," the process proceeds Step S806.

In Step S803, the speech-prompting sentence generator 115 collates the speech (first speech) having the speech flag "1" with the speech-prompting sentence table, determining whether or not the speech includes a phrase that accords with any word pattern. If the speech includes such a phrase, the process proceeds Step S804. If the speech does not include such a phrase, the process proceeds Step S805.

In Step S804, the speech-prompting sentence generator 115 refers to the speech-prompting sentence table and writes, in the speech-prompting sentence buffer 119-4, the speech-prompting sentence associated with the word pattern that accords with the phrase included in the speech, and the process is terminated.

In Step S805, the speech-prompting sentence generator 115 writes a default speech-prompting sentence in the speech-prompting sentence buffer 119-4, and the process is terminated. The default speech-prompting sentence may be any versatile sentence such as "How shall we do?"

In Step S806, the speech-prompting sentence generator 115 determines whether or not the speech flag attached to the latest speech is "2". If the speech flag is "2," the process proceeds Step S807. If the speech flag is not "2," the process is terminated.

In Step S807, the speech-prompting sentence generator 115 extracts, from the speech having the flag "2," the noun phrase that is the object of the verb used in the sentence.

In Step S808, the speech-prompting sentence generator 115 writes the noun phrase followed by "toha (which is)," in the speech-prompting sentence buffer 119-4, and then terminates the process. Alternatively, the question mark "?" may be added to the noun phrase extracted from the speech. Any phrase can be used only if it invites the user's specific response relating to the meaning of the noun phrase. Steps S807 and S808 are performed if no solutions have been extracted from the speech (i.e., second speech) having flag "2." That is, Steps S807 and S808 constitute a process of generating a speech-prompting sentence (i.e., second speech-prompting sentence) prompting the user to utter a speech that includes an expression not included in the second speech. Then, the speech-prompting sentence generator 115 terminates the generation process of the speech-prompting sentence.

Next, a solution extraction process of the solution extractor 116 will be explained with reference to the flowchart of FIG. 9.

In Step S901, the solution extractor 116 receives a speech from the speech buffer 119-1.

In Step S902, the solution extractor 116 receives a target problem, from the problem buffer 119-2.

In Step S903, the solution extractor 116 extracts the noun phrase (i.e., subject or object) and the verb (i.e., predicate) from the speech having flag "2." In this instance, the solution extractor 116 extracts the expression identical to a part of speech pattern of "noun phrase+verb" and sets the noun phrase to a variable N2 and the verb to a variable V2.

In Step S904, the solution extractor 116 determines whether or not the speech flag of the latest speech is "2."

If the speech flag is "2," the process proceeds Step S905. If the speech flag is not "2," the process proceeds Step S908.

In Step S905, the solution extractor 116 extracts the noun phrase from the target problem, and sets the noun phrase to variable N1.

In Step S906, the solution extractor 116 determines whether or not the variable N2 includes a noun different from the noun included in the variable N1. Assume that the noun processed in Step S906 is not a formal noun, such as "koto (event)," "toki (time)," "tokoro (place)" or "case,"

which has no substantive meaning and never modified by an adnominal modifier. Hence, "copying," for example, is used instead of the noun phrase of "place where a copy can be made." If the variable N2 includes a noun different from the noun included in the variable N1, the process proceeds Step S907. If the variable N2 does not include such a noun, the process is terminated.

In Step S907, the solution extractor 116 designates the expression of "N2 +case particle+V2" as the problem the solution, sets the certainty degree to "1.0," writes the solution and the certainty degree in the solution buffer 119-3. Then, the solution extractor 116 terminates the process.

In Step S908, the solution extractor 116 determines whether the speech flag of the latest speech is "3" or not. If the speech flag is "3," the process proceeds Step S909. If the speech flag is not "3," the process is terminated.

In Step S909, the solution extractor 116 extracts a noun phrase different from the noun phrase included in the variable N2, from the speech having flag "3," and sets the noun phrase to the variable N3.

In Step S910, the solution extractor 116 selects the expression of "N3+case particle+V2" as the solution, sets the certainty degree to "1.0," and writes the solution and certainty degree in the solution buffer 119-3. Then, the solution extractor 116 terminates the process. Thus, the process of extracting solutions is completed. One or more users may make speeches at the terminal device 130. In other word, the speech having flag "1" (i.e., first speech), the speech having flag "2" (i.e., second speech) and the speech having flag "3" (i.e., third speech) may be uttered by different users.

How the solution extractor 116 extracts solutions by another method will be explained with reference to the flowchart of FIG. 10. The method differs from the method explained with reference to FIG. 9, in that the solution extractor 116 refers to a keyword list in order to extract a noun phrase that will be used as the solution.

Figure 9:
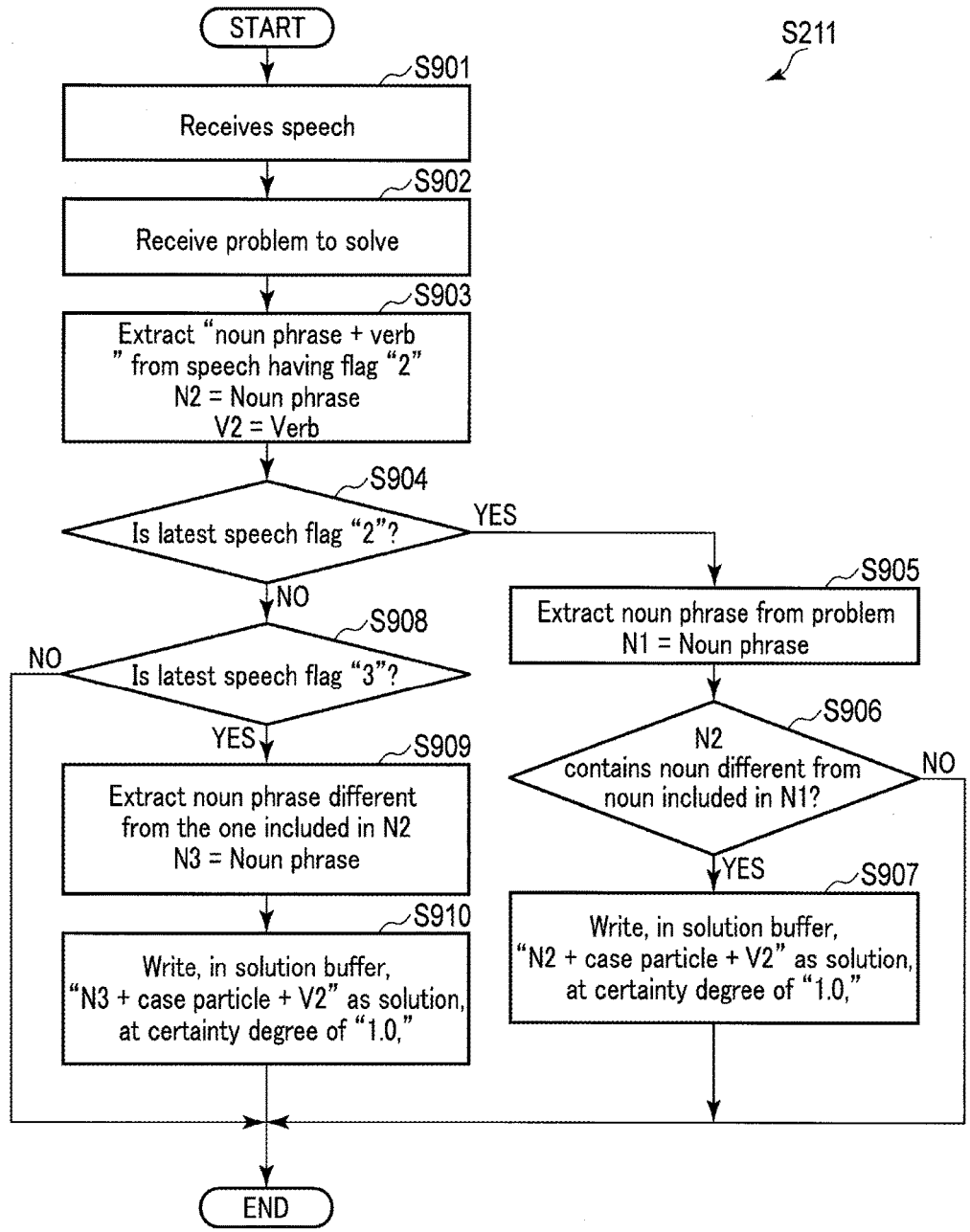
FIG. 9 is a flowchart showing a solution extraction process of the solution extractor.

All steps, except Steps S1001 and S1002, are identical to the steps shown in FIG. 9. Only Steps S1001 and S1002 will therefore be described below.

In Step S1001, the solution extractor 116 determines whether or not the noun phrase set to N2 is registered in the keyword list. If the noun phrase set is registered in the keyword list, the process proceeds Step S907. If the noun phrase set is not registered, the process is terminated.

In Step S1002, the solution extractor 116 determines whether or not the noun phrase set to N3 is registered in the keyword list. If the noun phrase set is registered in the keyword list, the process proceeds Step S910. If the noun phrase set is not registered, the process is terminated.

An example of the keyword list will be described with reference to FIG. 11.

In the keyword list 1100, IDs 1101 and keywords 1102 are stored in association with each other. ID 1102 of "L0001," for example, is associated with the keyword 1102 of "Konnbini (convenience store)." The places frequency retrieved and the application frequency used are preferably registered in the keyword list 1100.

Figure 12:
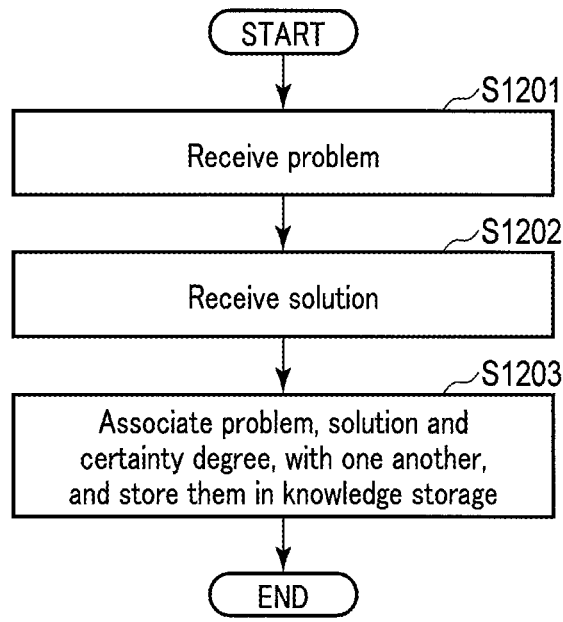
FIG. 12 is a flowchart showing a registering process of a knowledge register.

Next, a register process of the knowledge register 117 will be explained with reference to the flowchart of FIG. 12.

In Step S1201, the knowledge register 117 receives the problems from the problem buffer 119-2.

In Step S1202, the knowledge register 117 receives the solutions from the solution buffer 119-3.

In Step S1203, the knowledge register 117 stores the problems and the solutions in the knowledge storage 113, each problem associated with one measure and a certainty degree. Then, the knowledge registering process is terminated.

How the interaction apparatus 110 operates in practice will be explained below.

(First Example of Operation)

The user may say, "Copy wo wasure ta (I've forgotten copying it)." In this case, the acquisition unit 111 performs morpheme analysis on this speech, and the speech and the result of the morpheme analysis are stored in the speech buffer 119-1, in the form of a list number "1."

An example of the speech buffer 119-1 is shown in FIG. 13. In the table 1300, list numbers 1301, speeches 1302, morpheme analysis results 1303 and speech flags 1304 are stored in one-to-one association.

The morpheme analysis result 1303 for the speech "Copy wo wasure ta" is identical to the part of speech pattern 302 identified by ID301 "P003" shown in FIG. 3. The speech of "Copy wo wasure ta (I've forgotten copying it)" is therefore extracted as the target problem, and is stored in the problem buffer 119-2 shown in FIG. 14.

The problem extracting process is then performed. The table 500 stored in the knowledge storage 113 does not hold the problem associated with the speech of "Copy wo wasure ta (I've forgotten copying it)" or any related problem to this speech. To prompt the user to utter a speech including a solution to the problem, the process of generating a speech-prompting sentence is performed. The target problem of "Copy wo wasure ta (I've forgotten copying it)" is identical to the word pattern 702, i.e., "wasureta (forgotten)," associated with ID701 "H001" held in the speech-prompting sentence table 700 of FIG. 7. Therefore, the speech-prompting sentence generator 115 generates the speech-prompting sentence 703, "Nanika otetsudai dekirukoto ha arimasu ka (What can we do for you)?" The speech-prompting sentence 703 is output to the user, in the form of an audio message, in the subsequent process.

Assume that the user says, "Konnbini wo sagashite (Find a convenience store)" in response to the question of "Nanika otetsudai dekirukoto ha arimasu ka (What can we do for you?)" made by the interaction apparatus 110. Then, the acquisition unit 111 performs a morpheme analysis on the speech of "Find a convenience store." The speech and the morpheme analysis result are then written, as list number 1301 "2," in the speech buffer 119-1 as shown in FIG. 13.

The solution extractor 116 extracts a solution for the speech of "Konnbini wo sagashite (Find a convenience store)." In the process shown in the flowchart of FIG. 9, "convenience store" is set to N2, "sagasu (find)" is set to V2, and "Copy (copying)" is set to N1. In Step S906, N2 (i.e., convenience store) is found different from the noun included in N1 (i.e., Copy (copying)). Therefore, the solution extractor 116 performs the process of Step S907, thereby extracting, as a target solution, "N2+case particle+V2" that is the phrase of "Konnbini wo sagashite (Find a convenience store)." The solution extractor 116 then writes the solution in the solution buffer 119-3.

An example of the solution buffer 119-3 is shown in FIG. 15. The solution buffer 119-3 stores a table 1500. As shown in FIG. 15, the table 1500 holds a list number 1501, a solution 1502, a certainty degree 1503, and an identification flag 1504, which are associated with each other.

The response generator 118 receives the target solution from the solution buffer 119-3 and adjusts it in terms of expression, thereby generating a response text of "Konnbini wo sagashi masyou ka (Shall we find a convenience store?)"

The response text is output to the user in the form of an audio message, in the subsequent process.

Meanwhile, the knowledge register 117 associates the target problem of "Copy wo wasure ta (I've forgotten copying it)," the target solution of "Find a convenience store" and the certainty degree of "1.0," one with another. The knowledge register 117 then registers the target problem, target solution and certainty degree as new problem-solving knowledge, in the knowledge storage 113.

Thereafter, the user may say again, "Copy wo wasure ta (I've forgotten copying it.)" In this case, the solution 114 retrieves the solution of "Konnbini wo sagashite (Find a convenience store)" in accordance with the new problem-solving knowledge. The response generator 118 can therefore generate a response text of "Konnbini wo sagashi masyou ka (Shall we find a convenience store?)" The response text is output to the user, presenting a solution to him or her.

(Second Example of Operation)

If the user says, "Wasureta (I've forgotten)," the interaction apparatus 110 operates in the same way as in the first example of operation, until it gives the response of "Nanika otetsudai dekirukoto ha arimasu ka (What can we do for you)." Assume that the user says, "Copy ga dekiru tokoro wo sagashi te (Find a place where a copy can be made)" in reply.

Then, the solution extractor 116 performs a process of extracting solutions, in response to the speech of "Copy ga dekiru tokoro wo sagashi te (Find a place where a copy can be made.)" As seen from the flowchart of FIG. 9, "Copy (copying)" is set to N2, "find" is set to V2, and "Copy (copying)" is set to N1. As a result, N2 (copying) and N1 (copying) are found identical in Step S906. Hence, no solutions can be extracted. To prompt the user make a speech including a newly target solution, the speech-prompting sentence generator 115 therefore adds word "toha (is)" to the noun phrase extracted, i.e., "Copy ga dekiru tokoro (the place where a copy can be made)," and generates a noun phrase of "Copy ga dekiru tokoro toha (the place where a copy can be made is)." This noun phrase is written in the speech-prompting sentence buffer 119-4.

FIG. 16 shows an example of the speech-prompting sentence buffer 119-4. The speech-prompting sentence buffer 119-4 has a table 1600. In the table 1600, list numbers 1601 and speech-prompting sentences 1602 are associated in one-to-one association. The speech-prompting sentence of "Copy ga dekiru tokoro toha (The place where a copy can be made is . . . )" is output to the user in the form of an audio message.

Assume that the user may say "Konnbini ka na (Is it a convenience store?)" in response to the speech-prompting sentence of "Copy ga dekiru tokoro toha (The place where a copy can be made is . . . )." Since the speech of "C Konnbini ka na (Is it a convenience store?)" has flag "3," a noun phrase different from N2 (copy) is extracted from the speech of "Konnbini ka na (Is it a convenience store?)" in Step S909 of the flowchart of FIG. 9. The speech extracted is set "Konnbini (convenience store)" to N3. In Step S910, the solution extractor 116 writes "N3+case participle+V2," i.e., the phrase of "Konnbini wo sagasu (Find a convenience store)" as a target solution, together with the certainty degree "1.0," in the solution buffer 119-3. As in the first example of operation, the response generator 118 receives the target solution from the solution buffer 119-3 and adjusts the expression, generating a response text of "Konnbini wo sagashi masyou ka (Shall we find a convenience store?)" The response test is output to the user in the form of an audio message.

Meanwhile, the knowledge register 117 associates the target problem of "Copy wo wasureta (I've forgotten copying it)," the target solution of "Konnbini wo sagasu (Find a convenience store)," and the certainty degree of "1.0." The knowledge register 117 then registers the target problem, target solution and certainty degree as new problem-solving knowledge, in the knowledge storage 113. Thus, even if no target solution is acquired from the user's response, the interaction apparatus 110 again prompts the user to make a speech including a target solution, thereby to acquire the target solution. Hence, the interaction apparatus 110 can obtain the problem-solving knowledge, thus learning how to solve problems.

(Third Example of Operation)

Assume that a speech and a response are both similar to those made in the second example of operation. In the third example of operation, the solution extractor 116 does not determine whether or not N2 includes a noun different from the noun included in N1. Instead, it is determined whether or not the noun phrase extracted as N2 has been registered in the keyword list.

Figure 10:
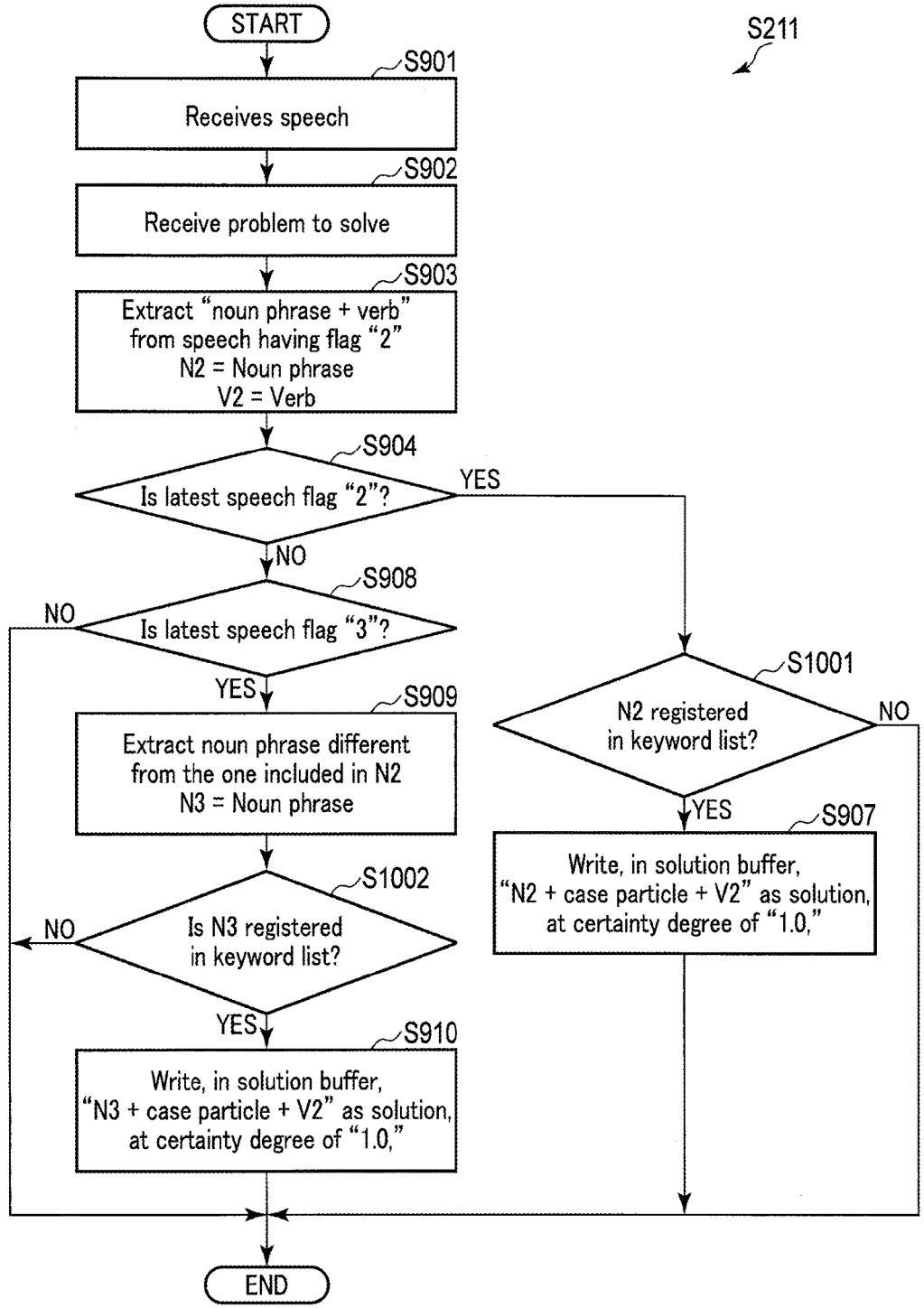
FIG. 10 is a flowchart showing another example of the solution extraction process.
Figure 11:
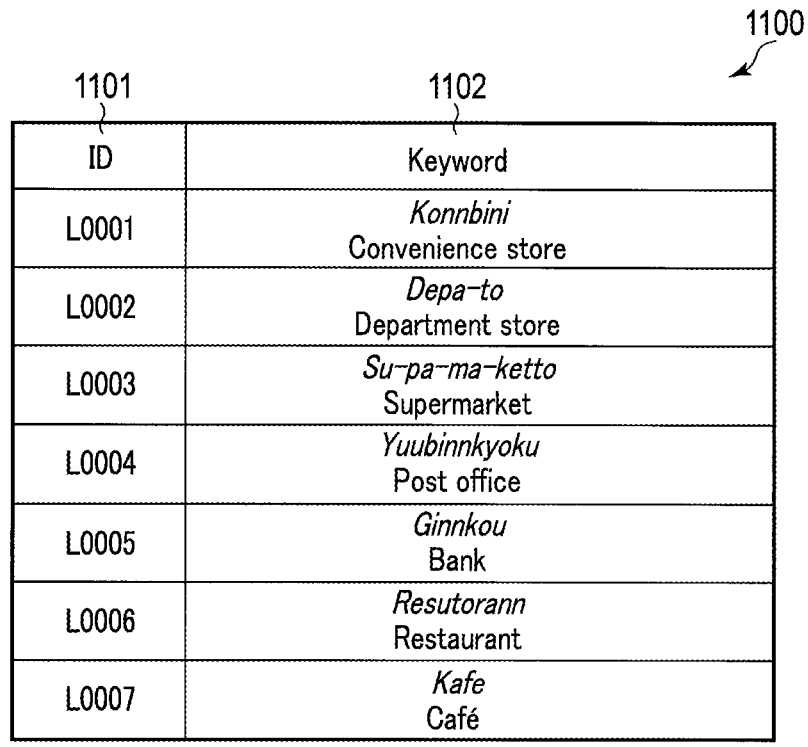
FIG. 11 is a diagram showing an example of the keyword list.

More specifically, the solution extractor 116 cannot extract any measures in response to the speech of "Copy ga dekiru tokoro wo sagashite (Find a place where a copy can be made)." As shown in FIG. 11, the keyword list 1100 does not hold "Copy ga dekiru tokoro (places where a copy can be made)," i.e., noun phrase extracted as N2 in Step S1001 shown in the flowchart of FIG. 10. Therefore, the speech-prompting sentence generator 115 generates a speech-prompting sentence of "Copy ga dekiru tokoro toha (the place where a copy can be made is . . . )." The speech-prompting sentence generated is written in the speech-prompting sentence buffer 119-4.

The solution extractor 116 performs the process of extracting solution, in reply to the next speech "Konnbini kana? (A convenience store?)" The phrase of "Konnbini wo sagasu (Find a convenience store)" can be acquired as a target solution, because "Konnbini (convenience store)" extracted as N3 in Step S1001 is identical to the keyword 1102 of ID1001 "L0001," i.e., "Konnbini (convenience store)."

(Fourth Example of Operation)

The fourth example of operation is based on the assumption that "Copy wo wasureta (I've forgotten copying it)" and "Konnbini wo sagasu (Find a convenience store)" have already been stored as problem-solving means of "Konnbini wo sagasu (Find a convenience store)" in the knowledge storage 113, and that the user has said, "kasa wo wasureta (I've left the umbrella there)." This speech, i.e., "kasa wo wasureta (I've left the umbrella there)," has the part of speech pattern identical to the pattern 302 of ID301 "P003" shown in FIG. 4. Therefore, the speech of "kasa wo wasureta (I've left the umbrella there) is extracted as the target problem and stored in the problem buffer 119-2 shown in FIG. 14.

The solution retriever 114 searches the knowledge storage 113 for a problem identical to the target problem of "kasa wo wasureta (I've left the umbrella there)." No problems identical to this target problem are stored in the knowledge storage 113. Nonetheless, the verb used in the target problem of "kasa wo wasureta (I've left the umbrella there)," i.e., "wasureta (forgotten)," is identical to the verb (i.e., "wasureta (forgotten)") used in the problem of "Copy wo wasureta (I've forgotten copying it)." Therefore, the problem "Copy wo wasureta (I've forgotten copying it)" is regarded as having similarity higher than the threshold value, the problem "Copy wo wasure ta (I've forgotten copying it)" is determined a related problem that relates to the target problem of "kasa wo wasureta (I've left the umbrella there)". The solution of "Konnbini wo sagasu (Find a convenience store)" is then extracted since it is associated with the related problem of "Copy wo wasureta (I've forgotten copying it)."

As in the first example of operation, the response generator 118 receives a target solution from the solution buffer 119-3, and adjusts the target solution in terms of expression, in accordance with the identification flag. The identification flag is "0 (zero)" because the target solution is associated with the related problem. Therefore, the response generator 118 adjusts the style of the target solution and generates a more polite response, such as "Yoroshikereba konnbini wo sagasi masyou ka? (Shall we find a convenience store, if you don't mind?)" This response text is output to the user in the form of an audio message, in the subsequent process. The user may make an affirmative response to the response text of "Yoroshikereba konnbini wo sagasi masyou ka? (Shall we find a convenience store, if you don't mind)?" If this is the case, the knowledge register 117 associates the target problem of "kasa wo wasureta (I've left the umbrella there)," the target solution of "Find a convenience store" and the certainty degree "1.0," one with another. Then, the knowledge register 117 registers, in the knowledge storage 113, the target problem, target solution and certainty degree, as new problem-solving knowledge.

Thus, the interaction apparatus 110 can present a measure for solving the target problem even if the knowledge storage 113 holds no problems associated with the target problem to solve.

In the embodiment described above, the interaction apparatus 110, terminal device 130, speech recognition server 140 and speech synthesis server 150 are utilized via the network 160. Nonetheless, the interaction system 100 may use neither the speech recognition server 140 nor the speech synthesis server 150, and may receive and output texts. Further, the interaction apparatus 110 may include a speech recognition unit and a speech synthesis unit, in place of the speech recognition server 140 and speech synthesis server 150, and may operate in the same manner as described above.

In the embodiment described above, if an appropriate solution cannot be given to the user, a speech-prompting sentence is generated, prompting the user to ask for an appropriate solution. From the user's speech, an appropriate solution can be extracted and shown to the user. Moreover, the interaction apparatus 110 can associate a problem with a solution, based on the user's speech, and can acquire problem-solving knowledge. This helps to reduce the cost of preparing the problem-solving knowledge and the cost of updating the problem-solving knowledge.

The flow charts of the embodiments illustrate methods and systems according to the embodiments. It should be understood that each block of the flowchart illustrations, and combinations of blocks in the flowchart illustrations, can be implemented by computer program instructions. These computer program instructions may be loaded onto a computer or other programmable apparatus to produce a machine, such that the instructions which execute on the computer or other programmable apparatus create means for implementing the functions specified in the flowchart block or blocks. These computer program instructions may also be stored in a computer-readable memory that can direct a computer or other programmable apparatus to function in a particular manner, such that the instruction stored in the computer-readable memory produce an article of manufacture including instruction means which implement the function specified in the flowchart block or blocks. The computer program instructions may also be loaded onto a computer or other programmable apparatus to cause a series of operational steps to be performed on the computer or other programmable apparatus to produce a computer programmable apparatus which provides steps for implementing the functions specified in the flowchart block or blocks.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The flow charts of the embodiments illustrate methods and systems according to the embodiments. It will be understood that each block of the flowchart illustrations, and combinations of blocks in the flowchart illustrations, can be implemented by computer program instructions. These computer program instructions may be loaded onto a computer or other programmable apparatus to produce a machine, such that the instructions which execute on the computer or other programmable apparatus create means for implementing the functions specified in the flowchart block or blocks. These computer program instructions may also be stored in a computer-readable memory that can direct a computer or other programmable apparatus to function in a particular manner, such that the instruction stored in the computer-readable memory produce an article of manufacture including instruction means which implement the function specified in the flowchart block or blocks. The computer program instructions may also be loaded onto a computer or other programmable apparatus to cause a series of operational steps to be performed on the computer or other programmable apparatus to produce a computer programmable apparatus which provides steps for implementing the functions specified in the flowchart block or blocks.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An interaction apparatus, comprising:
   a storage that stores a problem and at least one solution for solving the problem, in association with each other;
   a first extractor that extracts a target problem which is an expression regarded as the problem, from a first speech of a user;
   a retriever that retrieves, from the storage, a target solution which is a solution corresponding to the target problem;
   a generator that generates a first speech-prompting sentence if the storage stores no target solution or if the user rejects the target solution, the first speech-prompting sentence prompting the user to make a speech including the target solution;
a second extractor that extracts the target solution from a second speech which is a response of the user relating to the first speech-prompting sentence; and
a register that registers, on the storage, the target problem and the target solution in association with each other.

2. The apparatus according to claim 1, wherein the generator changes the first speech-prompting sentence in accordance with an expression of the first speech.

3. The apparatus according to claim 1, wherein the retriever acquires, as the target solution, a solution associated with a related problem if the related problem exists in the storage, the related problem relating to the target problem.

4. The apparatus according to claim 1, wherein the second extractor extracts, from the second speech, a noun phrase which is a subject or object and a verb which is a predicate, and acquires, as the target solution, an expression combined the noun phrase and the verb.

5. The apparatus according to claim 1, wherein
if the second speech fails to include a noun which is different from the noun included in the first speech and which is not a formal noun, the generator generates a second speech-prompting sentence prompting the user to make a speech including a solution that uses an expression different from the second speech; and
the second extractor extracts the target solution from a third speech which a response of the user relating to the second speech-prompting sentence.

6. The apparatus according to claim 1, wherein
if a noun phrase which is a subject or object in the second speech is not included in a keyword list, the generator generates a second speech-prompting sentence prompting the user to make a speech including a solution that uses an expression different from the second speech; and
the second extractor extracts the target solution from a third speech which a response of the user with respect to the second speech-prompting sentence.

7. The apparatus according to claim 5, wherein
the second extractor extracts, from the second speech, a first noun phrase that is a subject or object and a verb that is the predicate and extracts, from the third speech, a second noun phrase different from the first noun phrase, and acquires, as the target solution, an expression combined the second noun phrase and the verb.

8. An interaction method, comprising:
storing, in a storage, a problem and at least one solution for solving the problem, in association with each other;
extracting a target problem which is an expression regarded as the problem, from a first speech of a user;
retrieving, from the storage, a target solution which is a solution corresponding to the target problem;
generating a first speech-prompting sentence if the storage stores no target solution or if the user rejects the target solution, the first speech-prompting sentence prompting the user to make a speech including the target solution;
extracting the target solution from a second speech which is a response of the user relating to the first speech-prompting sentence; and
registering, on the storage, the target problem and the target solution in association with each other.

9. The method according to claim 8, further comprising changing the first speech-prompting sentence in accordance with an expression of the first speech.

10. The method according to claim 8, wherein the retrieving the target solution acquires, as the target solution, a solution associated with a related problem if the related problem exists in the storage, the related problem relating to the target problem.

11. The method according to claim 8, wherein the extracting the target solution extracts, from the second speech, a noun phrase which is a subject or object and a verb which is a predicate, and acquires, as the target solution, an expression combined the noun phrase and the verb.

12. The method according to claim 8, wherein
if the second speech fails to include a noun which is different from the noun included in the first speech and which is not a formal noun, the generating the first speech-prompting sentence generates a second speech-prompting sentence prompting the user to make a speech including a solution that uses an expression different from the second speech; and
the extracting the target solution extracts the target solution from a third speech which a response of the user relating to the second speech-prompting sentence.

13. The method according to claim 8, wherein
if a noun phrase which is a subject or object in the second speech is not included in a keyword list, the generating the first speech-prompting sentence generates a second speech-prompting sentence prompting the user to make a speech including a solution that uses an expression different from the second speech; and
the extracting the target solution extracts the target solution from a third speech which a response of the user with respect to the second speech-prompting sentence.

14. The method according to claim 12, wherein
the extracting the target solution extracts, from the second speech, a first noun phrase that is a subject or object and a verb that is the predicate and extracts, from the third speech, a second noun phrase different from the first noun phrase, and acquires, as the target solution, an expression combined the second noun phrase and the verb.

15. A non-transitory computer readable medium including computer executable instructions, wherein the instructions, when executed by a processor, cause the processor to perform a method comprising:
storing, in a storage, a problem and at least one solution for solving the problem, in association with each other;
extracting a target problem which is an expression regarded as the problem, from a first speech of a user;
retrieving, from the storage, a target solution which is a solution corresponding to the target problem;
generating a first speech-prompting sentence if the storage stores no target solution or if the user rejects the target solution, the first speech-prompting sentence prompting the user to make a speech including the target solution;
extracting the target solution from a second speech which is a response of the user relating to the first speech-prompting sentence; and
registering, on the storage, the target problem and the target solution in association with each other.

16. The medium according to claim 15, further comprising changing the first speech-prompting sentence in accordance with an expression of the first speech.

17. The medium according to claim 15, wherein the retrieving the target solution acquires, as the target solution, a solution associated with a related problem if the related problem exists in the storage, the related problem relating to the target problem.

18. The medium according to claim 15, wherein the extracting the target solution extracts, from the second speech, a noun phrase which is a subject or object and a verb which is a predicate, and acquires, as the target solution, an expression combined the noun phrase and the verb.

19. The medium according to claim 15, wherein
if the second speech fails to include a noun which is different from the noun included in the first speech and which is not a formal noun, the generating the first speech-prompting sentence generates a second speech-prompting sentence prompting the user to make a speech including a solution that uses an expression different from the second speech; and
the extracting the target solution extracts the target solution from a third speech which a response of the user relating to the second speech-prompting sentence.

20. The medium according to claim 15, wherein
if a noun phrase which is a subject or object in the second speech is not included in a keyword list, the generating the first speech-prompting sentence generates a second speech-prompting sentence prompting the user to make a speech including a solution that uses an expression different from the second speech; and
the extracting the target solution extracts the target solution from a third speech which a response of the user with respect to the second speech-prompting sentence.

\* \* \* \* \*